United States Patent
Gou

(10) Patent No.: US 7,605,639 B2
(45) Date of Patent: Oct. 20, 2009

(54) INTERNAL VOLTAGE GENERATOR OF SEMICONDUCTOR MEMORY DEVICE

(75) Inventor: Ja-Seung Gou, Kyoungki-do (KR)

(73) Assignee: Hynix Semiconductor, Inc., Gyeonggi-do (KR)

( * ) Notice: Subject to any disclaimer, the term of this patent is extended or adjusted under 35 U.S.C. 154(b) by 0 days.

(21) Appl. No.: 11/966,810

(22) Filed: Dec. 28, 2007

(65) Prior Publication Data

US 2008/0258801 A1    Oct. 23, 2008

(30) Foreign Application Priority Data

Apr. 18, 2007    (KR) .................. 10-2007-0037938

(51) Int. Cl.
G05F 1/10    (2006.01)

(52) U.S. Cl. ..................... 327/536; 327/534

(58) Field of Classification Search .......... 327/534–537
See application file for complete search history.

(56) References Cited

U.S. PATENT DOCUMENTS

| | | | |
|---|---|---|---|
| 5,886,567 A | 3/1999 | Park et al. | |
| 5,889,664 A | 3/1999 | Oh | |
| 6,169,426 B1 | 1/2001 | Lee et al. | |
| 6,580,312 B1 * | 6/2003 | Kim | 327/536 |
| 6,876,246 B2 * | 4/2005 | Kim | 327/536 |
| 7,474,140 B2 * | 1/2009 | Gou | 327/536 |

FOREIGN PATENT DOCUMENTS

| | | |
|---|---|---|
| JP | 10-199244 | 7/1998 |
| KR | UM20000018207 | 10/2000 |
| KR | 1020020078971 | 10/2002 |

OTHER PUBLICATIONS

Foreign Office Action issued from Korean Intellectual Property Office on May 27, 2008 with an English translation.

* cited by examiner

*Primary Examiner*—Dinh T. Le
(74) *Attorney, Agent, or Firm*—IP & T Law Firm PLC

(57) ABSTRACT

An internal voltage generator is capable of supplying a stable internal voltage regardless of an unstable external voltage. The internal voltage includes a first level detecting unit configured to detect a voltage level of the internal voltage and output an output power detecting signal, an oscillating unit configured to produce a periodical signal in response to the output power detecting signal, a second level detecting unit configured to detect a voltage level of an external voltage and output a driving power detecting signal, a dividing unit configured to selectively divide the periodical signal in response to the driving power detecting signal and output a divided signal, and a charge pumping unit configured to provide the internal voltage by pumping the external voltage in response to the divided signal.

9 Claims, 5 Drawing Sheets

INTERNAL VOLTAGE GENERATOR OF SEMICONDUCTOR MEMORY DEVICE

CROSS-REFERENCE TO RELATED APPLICATIONS

The present invention claims priority to Korean patent application number 10-2007-0037938, filed on Apr. 18, 2007, which is incorporated by reference in its entirety.

BACKGROUND OF THE INVENTION

The present invention relates to a semiconductor design technology; and, more particularly, to an internal voltage generator capable of supplying a stable internal voltage regardless of an unstable external voltage.

An internal voltage generator, which is used as a power source in a semiconductor memory device, supplies internal voltages in different levels using an external supply. Particularly, as the trend of low voltage and low power consumption is getting increased in the semiconductor memory device, the internal voltage generator is employed in dynamic random access memories recently. Meanwhile, since a voltage required to drive a circuit is produced in the device itself, many efforts are made to produce internal voltages which have a stable level regardless of the changes of the ambient temperature, the process, the pressure and so on.

FIG. 1 is a block diagram illustrating a conventional internal voltage generator. Referring to FIG. 1, the conventional internal voltage generator includes a level detecting unit 10 for detecting a level of a high voltage VPP, an oscillator 20 for producing a periodical signal OSC in response to a detecting signal DT_EN from the level detecting unit 10, and a charge pumping unit 30 for producing the high voltage VPP, which is higher than the external supply voltage VDD, by pumping charges from an external supply voltage VDD in response to the periodical signal OSC.

As described above, the conventional internal voltage generator produces the periodical signal OSC by driving an output signal of the oscillator 20 after detecting the voltage level drop of the high voltage VPP via the level detecting unit 10. Also, the charge pumping unit 30 is activated during the activation of the periodical signal OSC and maintains a predetermined level of the high voltage VPP.

Referring to FIG. 2, the oscillator 20 in the conventional internal voltage generator includes a NAND gate ND1 for NANDing a detecting signal and the periodical signal OSC, and a delay unit 22 for outputting the signal OSC by delaying an output signal of the NAND gate ND1. That is, the oscillator 20 produces the periodical signal OSC which has a half period of time through the NAND gate ND1 and the delay unit 22 at the time of the activation of the detecting signal.

FIG. 3 is a circuit diagram illustrating the charge pumping unit 30 of FIG. 1. Referring to FIG. 3, the charge pumping unit 30 includes an inverter I7 for inverting the periodical signal OSC, a capacitor C1 for storing electric charges in an output terminal of the inverter I7, a PMOS transistor PM1 for driving a supply terminal for the high voltage VPP in response to the external voltage VDD, and a capacitor C2, which is connected to the supply terminal for the high voltage VPP, for storing the electric charges.

As described above, the charge pumping unit 30 includes the capacitors C1 and C2 and the PMOS transistor PM1. Meanwhile, the driving of the conventional internal voltage generator will be illustrated briefly referring to FIGS. 1 and 2. First, the detecting signal is activated by the level detecting unit 10 in case where the level of the high voltage VPP is lower than the target value. Subsequently, the oscillator 20 produces the periodical signal OSC having a predetermined period of time while the detecting signal is activated.

The external voltage VDD is stored in the capacitor C1 in the charge pumping unit 30 and initialized. Subsequently, if the periodical signal OSC transits to a high level, the PMOS transistor PM1 is turned off and the high voltage VPP of 0V is outputted. Subsequently, if the periodical signal OSC transits to a low level, the PMOS transistor PM1 is turned on so that a voltage level of 2×VDD, which is taken by the external voltage VDD and the capacitor C1, is applied to the supply terminal of the high voltage VPP. At this time, the high voltage VPP of 2×VDD is also stored in the capacitor of the supply terminal.

The driving operations, as described above, are repeatedly performed such that the high voltage VPP which is higher than the external voltage VDD level from the input power source is supplied. In this way, the charge pumping unit 30 essentially conducts the operation mode to store the electric charges in a capacitor through the level swing of the external voltage VDD. Therefore, the pumped current amount increases linearly with the increase of the power supply voltage.

On the other hand, in the conventional charge pumping unit, there is a problem in that the supplied high voltage VPP is also increased when the external voltage VDD is increased. The reason why the supplied high voltage VPP is increased is that the driving of the level detecting unit is not fast although the external voltage VDD is increased. In other words, the switching current of the charge pumping unit increases and the period of the periodical signal OSC is short when the external voltage VDD is increased. Therefore, as the external voltage VDD is increased, an amount of the current pumped by the charge pumping unit is exponentially increased such that the charges stored in the capacitor are accumulated with the increase of the high voltage VPP. However, as described above, since the driving of the level detecting unit is not fast in compliance with the increase of the accumulated high voltage VPP, the increased voltage level is detected by the level detecting unit after the high voltage VPP has been already increased. That is, the supplied high voltage VPP is increased over a target value due to the increase of the external voltage VDD. Furthermore, the unstable level of the high voltage VPP can deteriorate the reliability of the semiconductor memory device.

SUMMARY OF THE INVENTION

Embodiments of the present invention are directed to providing an internal voltage generator capable of supplying a stable internal voltage regardless of an unstable external voltage.

In accordance with an aspect of the present invention, there is provided an apparatus for generating an internal voltage, including a first level detecting unit configured to detect a voltage level of the internal voltage and output an output power detecting signal, an oscillating unit configured to produce a periodical signal in response to the output power detecting signal, a second level detecting unit configured to detect a voltage level of an external voltage and output a driving power detecting signal, a dividing unit configured to selectively divide the periodical signal in response to the driving power detecting signal and output a divided signal, and a charge pumping unit configured to provide the internal voltage by pumping the external voltage in response to the divided signal.

In accordance with another aspect of the present invention, there is provided a method for generating an internal voltage, including detecting a voltage level of an internal voltage, producing a periodical signal when the internal voltage is lower than a target value, detecting a voltage level of an external voltage, dividing the periodical signal when the external voltage is lower than a reference voltage, wherein the divided periodical signal has a half period of time in comparison with the periodical signal, and providing the internal voltage by pumping the external voltage during an activation of the divided periodical signal.

DESCRIPTION OF SPECIFIC EMBODIMENTS

Hereinafter, a semiconductor memory device in accordance with the present invention will be described in detail referring to the accompanying drawings.

Figure 1:
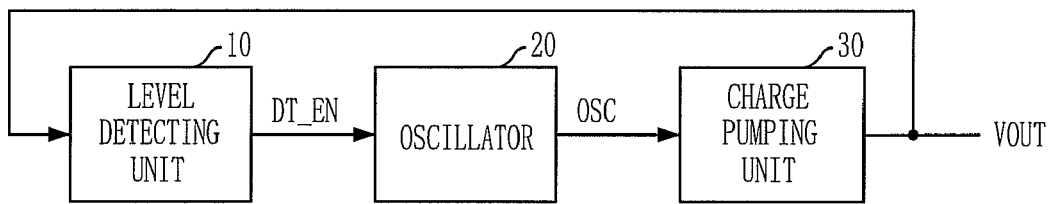
FIG. 1 is a block diagram illustrating a conventional internal voltage generator.
Figure 2:
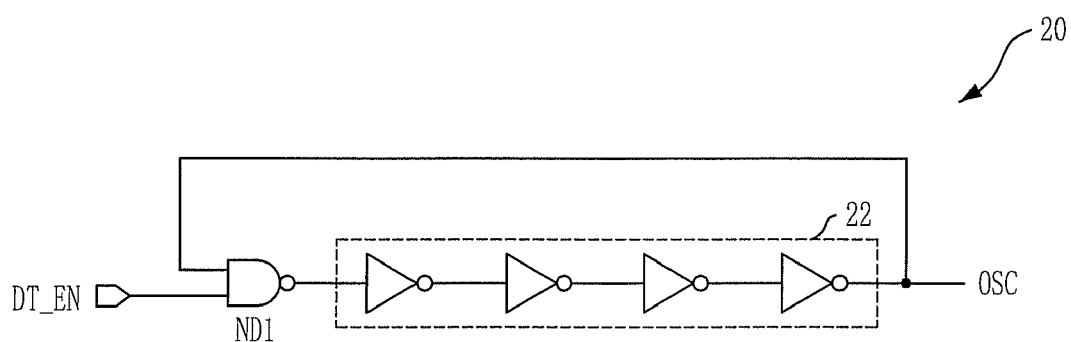
FIG. 2 is a circuit diagram illustrating an oscillator of FIG. 1.
Figure 3:
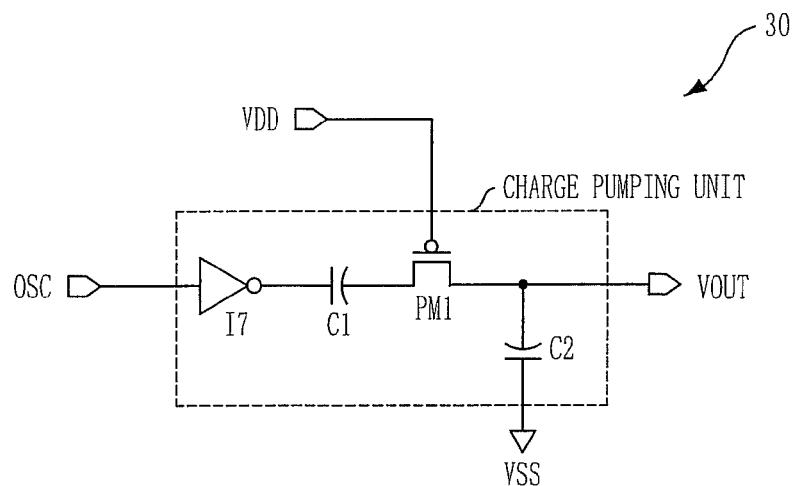
FIG. 3 is a circuit diagram illustrating a charge pumping unit of FIG. 1.
Figure 4:
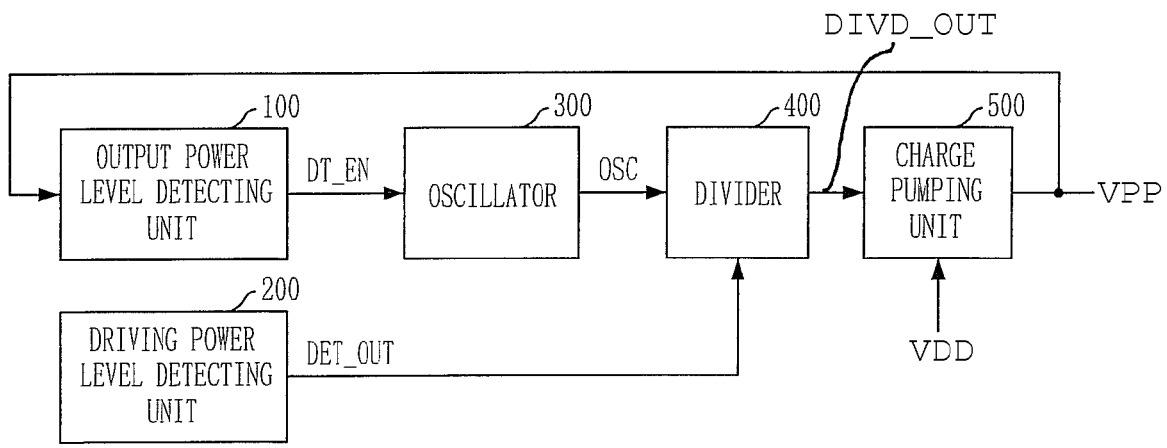
FIG. 4 is a block diagram illustrating an internal voltage generator according to one embodiment of the present invention.

Referring to FIG. 4, an internal voltage generator according to one embodiment of the present invention includes an output power level detecting unit 100 for detecting a level of a high voltage VPP, an oscillator 300 for producing a periodical signal OSC in response to a detecting signal DT_EN from the output power level detecting unit 100, a driving power level detecting unit 200 for detecting a level of an external voltage VDD, a divider 400 for dividing a cycle of the periodical signal OSC in response to an output signal from the driving power level detecting unit 200 and outputting divided clocks, and a charge pumping unit 500 for producing a high voltage VPP by pumping charges from the external voltage VDD in response to an output signal of the divider 400.

In the present invention, in the case where the level boosting of the external voltage VDD is detected through the driving power level detecting unit 200, the level boosting of the external voltage VDD can be prevented by lengthening a period of a cycle of the periodical signal OSC through the divider 400. More particularly, the configuration of the internal voltage generator according to one embodiment of the present invention will be described referring to the accompany drawings below.

Figure 5:
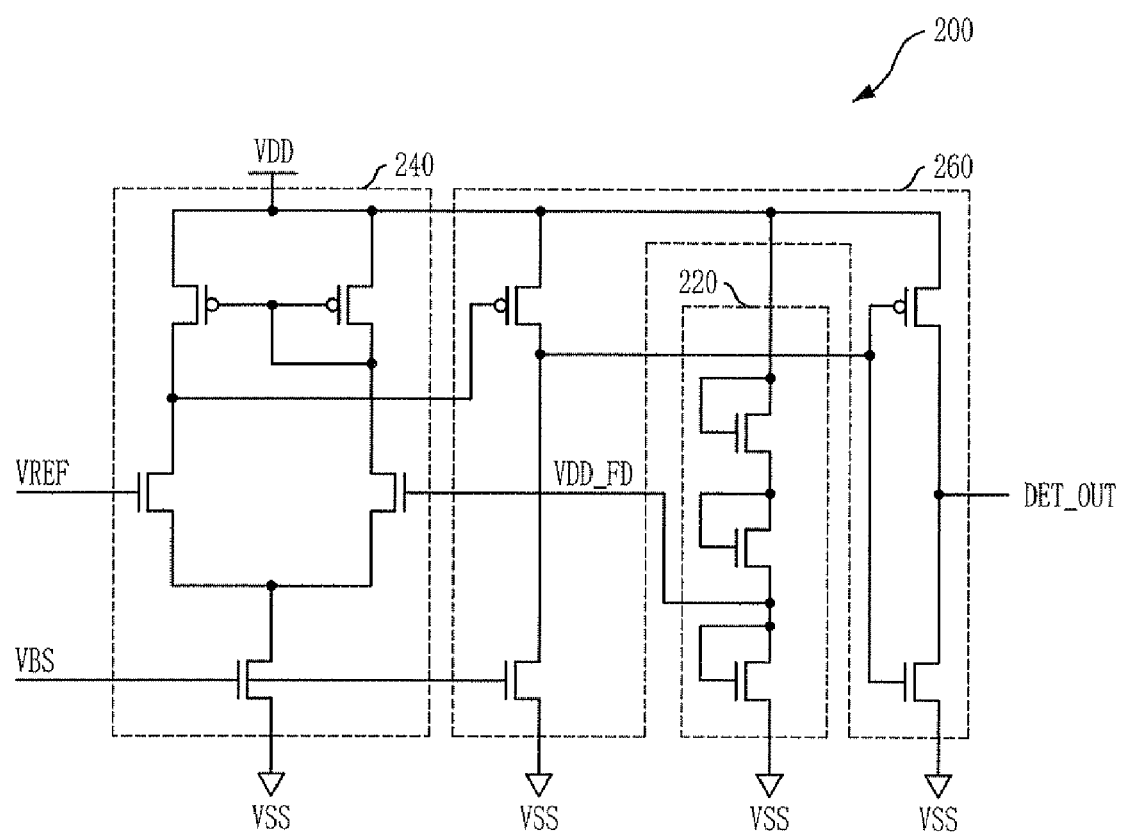
FIG. 5 is a circuit diagram illustrating a driving power level detector of FIG. 4.

FIG. 5 is a circuit diagram illustrating the driving power level detector 200 of FIG. 4. Referring to FIG. 5, the driving power level detector 200 includes a voltage divider 220 for dividing the external voltage VDD and outputting the divided voltage as a feedback voltage VDD_FD, a differential amplifier 240 which is driven by a bias voltage VBS and receives the feedback voltage VDD_FD and a reference voltage VREF as differential input signals, and an output unit 260 for outputting an output voltage of the differential amplifier 240 as a driving power detecting signal DET_OUT.

First, the voltage divider 220 outputs the feedback voltage VDD_FD by dividing the external voltage VDD. The differential amplifier 240 outputs an output voltage to a low level when the feedback voltage VDD_FD goes to a lower level than the reference voltage VREF. The output unit 260 inactivates the driving power detecting signal DET_OUT to a low level in response to the output voltage.

Meanwhile, when the external voltage VDD is increased and the feedback voltage VDD_FD is higher than the reference voltage VREF, the differential amplifier 240 outputs an output voltage in a high level and the output unit 260 activates the driving power detecting signal DET_OUT in a high level in response to the output signal of the differential amplifier 240. In this way, the driving power level detecting unit 200 detects an increase of a voltage level of the external voltage VDD and then activates the driving power detecting signal DET_OUT.

Figure 6:
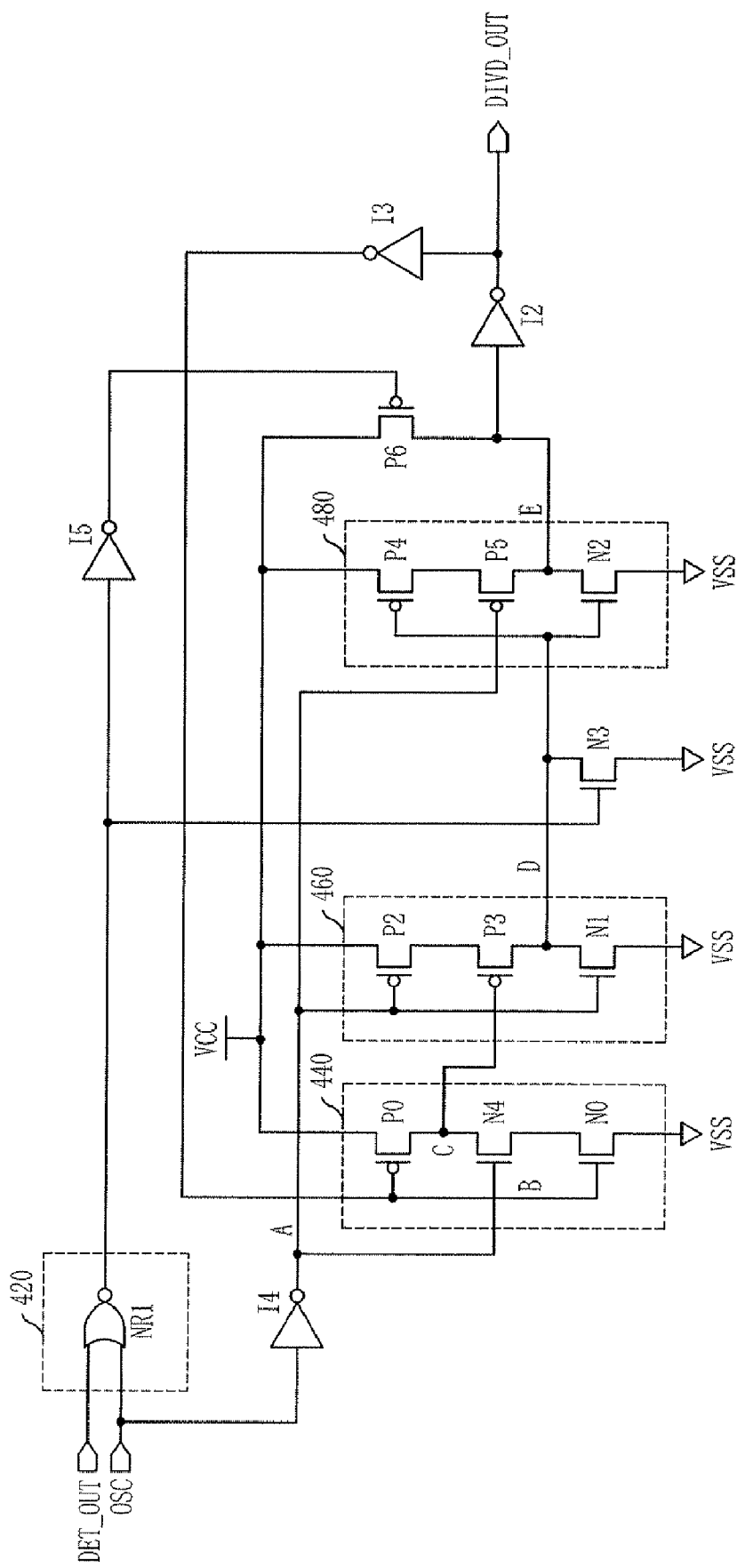
FIG. 6 is a circuit diagram illustrating a divider of FIG. 4.

FIG. 6 is a circuit diagram illustrating the divider 400 of FIG. 4. The divider 400 includes a driving control unit 420 for outputting positive/negative driving control signals by receiving the driving power detecting signal DET_OUT and the periodical signal OSC, a PMOS transistor P6 for driving node E in response to the positive driving control signal, an inverter I2 for inverting a voltage signal applied to node E, an inverter I3 for inverting an output signal of the inverter I2, an inverter I4 for inverting the periodical signal OSC, an inverter 440 for inverting an output signal of the inverter I3 in response to an output signal of the inverter I4, an inverter 460 for inverting an output signal of the inverter I4 in response to an output signal of the inverter, an inverter 480 for driving node E by inverting an output signal of the inverter 460 in response to the output signal of the inverter I4, and an NMOS transistor N3 for driving an output node of the inverter 480 in response to the negative driving control signals.

The driving control unit 420 includes a NOR gate NR1 for outputting the negative driving control signal using the driving power detecting signal DET_OUT and the periodical signal OSC, and an inverter I5 for inverting an output signal of the NOR gate NR1 in order to output the positive driving control signal.

The inverter 440 includes a PMOS transistor P0 which has a source-drain connection between the voltage supply terminal of the external voltage VDD and node C and a gate to receive the output signal of the inverter I3, an NMOS transistor N4 which has a gate to receive the output signal of the inverter I4 and a drain connected to node C, and an NMOS transistor N0 which has a gate to receive the output signal of the inverter I3 and a drain-source connection between the source of the NMOS transistor N4 and a ground voltage VSS.

The inverter 460 includes a PMOS transistor P2 which has a gate to receive the output signal of the inverter I4 and a source connected to the voltage supply terminal of the external voltage VDD, a PMOS transistor P3 which has a gate to receive a voltage applied to node C and a source-drain connection between the drain of the PMOS transistor P2 and node D, and an NMOS transistor N1 which has a gate to receive the output signal of the inverter I4 and a drain-source connection between node D and the supply terminal of the ground voltage VSS.

The inverter 480 includes a PMOS transistor P4 which has a gate to receive the voltage applied to node D and a source connected to the voltage supply terminal of the external voltage VDD, a PMOS transistor P5 which has a gate to receive the output signal of the inverter I4 and a source-drain connection between the drain of the PMOS transistor P4 and node E, and an NMOS transistor N2 which has a gate to receive the voltage applied to node D and a drain-source connection between node E and the supply terminal of the ground voltage VSS.

Next, the operation of the divider 400 will be illustrated in detail below. First, in the case where the driving power detecting signal DET_OUT is inactivated to a low level, the operation of the divider 400 will be illustrated. The periodical signal OSC is inverted through the NOR gate NR1 and the inverter I5. At this time, when the periodical signal OSC is in a low level, the NMOS transistors N4 and N1 which receive the output signal of the inverter I4 are turned on and the PMOS transistors P2 and P5 are turned off. The NMOS transistor N3 which receives the output signal of the NOR gate NR1 is turned on such that the PMOS transistor P4 is turned on and the NMOS transistor N2 is turned off because the voltage level on node D is low. The voltage on node E goes to a high level due to the PMOS transistor P6 which is turned on in response to the output signal inverter I5. Therefore, a low level signal is outputted through the inverter I2 to invert the voltage level on node E.

When the periodical signal OSC is in a high level, the NMOS transistors N1, and N3 and N4 are turned off and the PMOS transistor P2 and P5 are turned on. The NMOS transistor N0 is turned on and the PMOS transistor is turned off. At this time, since the NMOS transistor N4 is turned off, the voltage level on node C is maintained in a low level. The PMOS transistor P3 of which the gate is connected to node C is turned on and the PMOS transistor P2 of which the gate receives the inverted periodical signal OSC is turned on, thereby providing a high level on node D. Subsequently, the NMOS transistor N2 of which the gate is connected to node D is turned on so that node E goes to a low level and the final voltage level is outputted in a high level through the inverter I2.

Meanwhile, when the driving power detecting signal DET_OUT is activated to a high level, the output signal of the NOR gate is fixed to a low level and the output signal of the inverter I5 is fixed to a high level. The NMOS transistor N3 and the PMOS transistor P6, which receive the output signals of the NOR gate NR1 and the inverter I5, respectively, are turned off. The output signal of the divider 400 is transited whenever the periodical signal OSC goes from a low level to a high level. That is, the output signal has a period of time twice as much as the periodical signal OSC.

Figure 7:
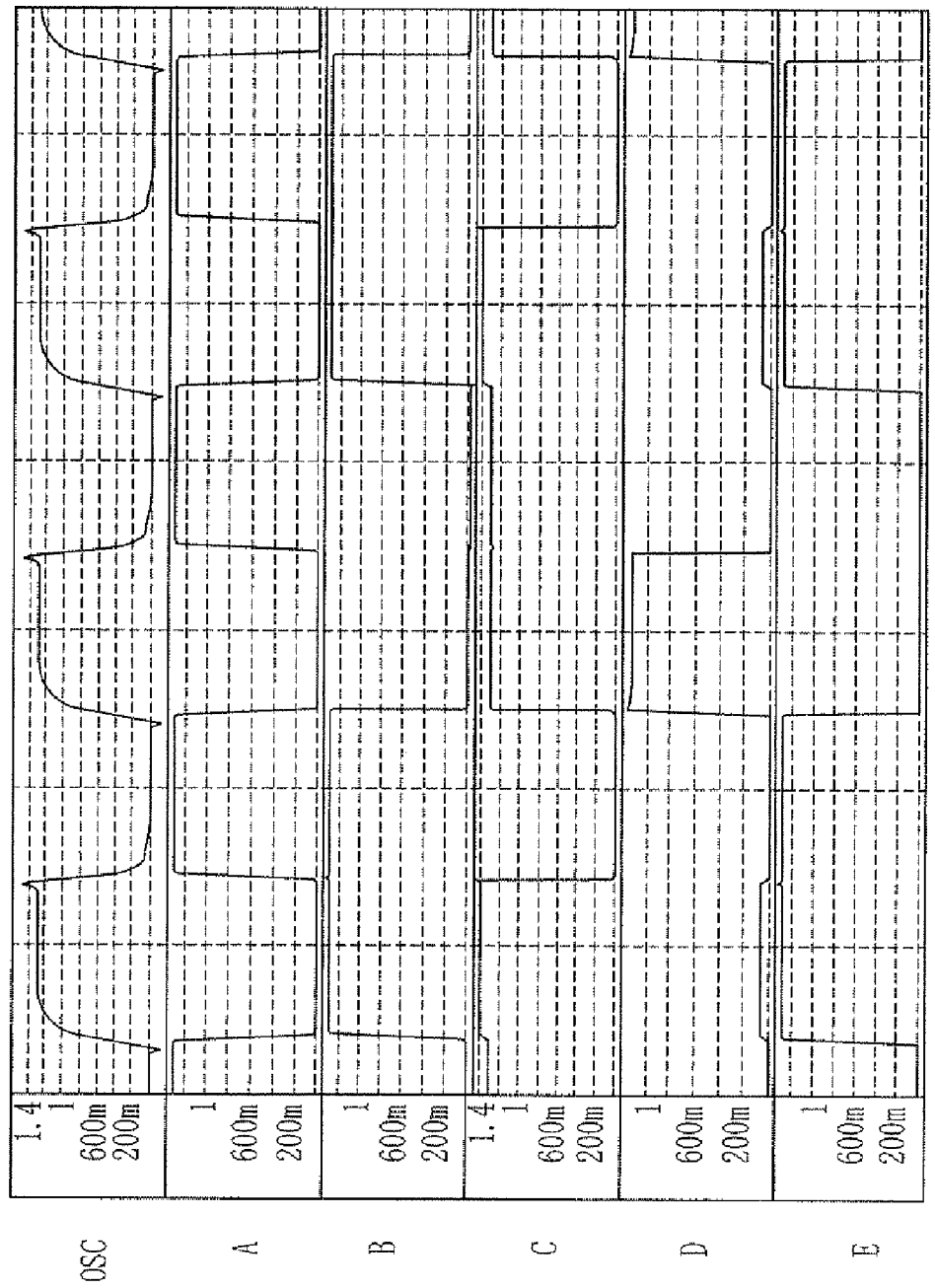
FIG. 7 is a waveform illustrating an operation of the divider of FIG. 6.

FIG. 7 is a waveform illustrating the operation of the divider 400 of FIG. 6. Particularly, the waveform is shown in the case where the driving power detecting signal DET_OUT is activated to a high level. As described above, the waveform shows that the output signal of the divider 400 is transited whenever the periodical signal OSC goes from a low level to a high level. That is, the output signal has a period of time twice as much as the periodical signal OSC and is a half of the periodical signal OSC in frequency.

Therefore, in the case where the level of the external voltage VDD goes over the reference voltage VREF, the driving power level detecting unit 200 and the divider 400 lengthens the period of the signal which is capable of controlling the driving time of the charge pumping unit. In this way, the driving frequency of the charge pumping unit is reduced by such a longer period of time and the level of the high voltage VPP is stabilized.

In other words, although the voltage level of the external voltage VDD is increased, the internal voltage generator makes the amount of charge-pumped current maintained in a constant level by preventing the frequency of the control signal, which controls the driving of the charge pumping unit, from being increased. Therefore, the level of the supplied high voltage VPP is steadily maintained even if the external voltage VDD is increased and the reliability of the semiconductor memory device is secured by this stable internal voltage generator.

In the above-described present invention, although the case where the high voltage VPP, which is higher than the external voltage VDD, is produced by pumping charges from the external voltage VDD is exemplarily illustrated; however, it is possible to produce other voltage levels such as various internal voltages which are higher than a ground voltage.

As apparent from the above, according to the present invention, the voltage level of the internal voltage is maintained in a constant level regardless of the increase of the external voltage, by preventing the frequency of the control signal, which controls the driving of the charge pumping unit, from being increased.

While the present invention has been described with respect to the particular embodiments, it will be apparent to those skilled in the art that various changes and modifications may be made without departing from the spirit and scope of the invention as defined in the following claims.

What is claimed is:

1. An apparatus for generating an internal voltage comprising:
    a first level detecting unit configured to detect a voltage level of the internal voltage and output an output power detecting signal;
    an oscillating unit configured to produce a periodical signal in response to the output power detecting signal;
    a second level detecting unit configured to detect a voltage level of an external voltage and output a driving power detecting signal;
    a dividing unit configured to selectively divide the periodical signal in response to the driving power detecting signal and output a divided signal; and
    a charge pumping unit configured to provide the internal voltage by pumping charges from the external voltage to provide the internal voltage having a voltage level higher than the voltage level of the external voltage in response to the divided signal.

2. The apparatus of claim 1, wherein the dividing unit includes:
    a driving control unit configured to output positive/negative driving control signals by receiving the driving power detecting signal and the periodical signal;
    a first PMOS transistor configured to drive a first node in response to the positive driving control signal;
    a first inverter configured to invert a voltage signal applied to the first node;
    a second inverter configured to invert an output signal of the first inverter;
    a third inverter configured to invert the periodical signal;
    a first control inverter configured to invert an output signal of the second inverter in response to an output signal of the third inverter;
    a second control inverter configured to invert the output signal of the third inverter in response to an output signal of the first control inverter;
    a third control inverter configured to invert the first node by inverting an output signal of the second control inverter in response to the output signal of the third inverter; and
    a first NMOS transistor configured to drive an output node of the third control inverter in response to the negative driving control signal.

3. The apparatus of claim 2, wherein the second level detecting unit includes:

a voltage divider configured to divide the external voltage and output the divided voltage as a feedback voltage;

a differential amplifier driven by a bias voltage and configured to receive the feedback voltage and a reference voltage as differential input signals; and an output unit configured to output an output voltage of the differential amplifier as the driving power detecting signal.

4. The apparatus of claim 3, wherein the driving control unit includes:

a NOR gate configured to output the negative driving control signal using the driving power detecting signal and the periodical signal; and a fourth inverter configured to invert an output signal of the NOR gate in order to output the positive driving control signal.

5. The apparatus of claim 4, wherein the first control inverter includes:

a second PMOS transistor, which has a source-drain connection between a terminal of the external voltage and a second node and a gate to receive the output signal of the second inverter;

a second NMOS transistor which has a gate to receive the output signal of the third inverter and a drain connected to the second node; and a third NMOS transistor which has a gate to receive the output signal of the second inverter and a drain-source connection between a source of the second NMOS transistor and a terminal of a ground voltage.

6. The apparatus of claim 5, wherein the second control inverter includes:

a third PMOS transistor which has a gate to receive the output signal of the third inverter and a source connected to the terminal of the external voltage;

a fourth PMOS transistor which has a gate to receive a voltage applied to the second node and a source-drain connection between a drain of the third PMOS transistor and a third node; and a fourth NMOS transistor which has a gate to receive the output signal of the third inverter and a drain-source connection between the third node and the terminal of the ground voltage.

7. The apparatus of claim 6, wherein the third control inverter includes:

a fifth PMOS transistor which has a gate to receive a voltage applied to the third node and a source connected to the terminal of the external voltage;

a sixth PMOS transistor which has a gate to receive the output signal of the third inverter and a source-drain connection between a drain of the fifth PMOS transistor and the first node; and a fifth NMOS transistor which has a gate to receive the voltage applied to the third node and a drain-source connection between the terminal of the ground voltage and the first node.

8. The apparatus of claim 1, wherein the internal voltage is a high voltage which is higher than the external voltage.

9. A method for generating an internal voltage comprising:

detecting a voltage level of an internal voltage;

producing a periodical signal when the internal voltage is lower than a target value;

detecting a voltage level of an external voltage;

dividing the periodical signal when the external voltage is lower than a reference voltage, wherein the divided periodical signal has a half period of time in comparison with the periodical signal; and providing the internal voltage by pumping charges from the external voltage during an activation of the divided periodical signal to provide the internal voltage having a voltage level higher than the voltage level of the external voltage.

* * * * *